J. BIGNAN.
LUBRICATING SYSTEM.
APPLICATION FILED MAR. 5, 1918.
1,398,170.
Patented Nov. 22, 1921.
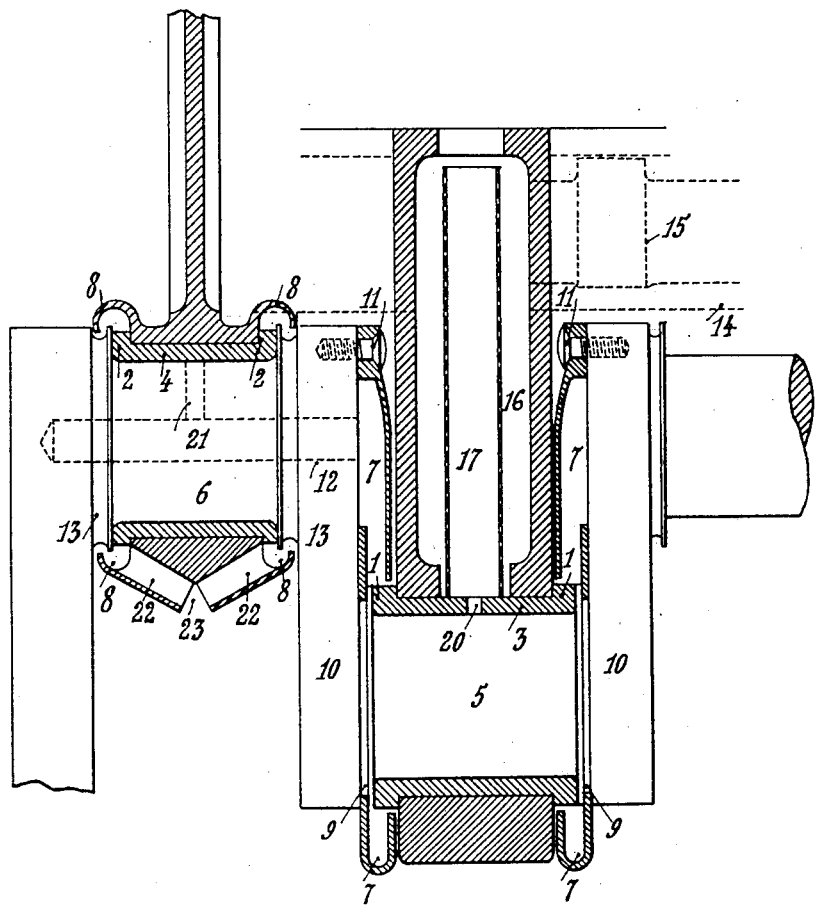
Inventor
Jacques Bignan
Attorney

UNITED STATES PATENT OFFICE.

JACQUES BIGNAN, OF PUTEAUX, FRANCE.

LUBRICATING SYSTEM.

1,398,170.　　　　Specification of Letters Patent.　　Patented Nov. 22, 1921.

Application filed March 5, 1918. Serial No. 220,581.

*To all whom it may concern:*

Be it known that I, JACQUES BIGNAN, a citizen of the Republic of France, and resident of Puteaux, Republic of France, have invented certain new and useful Improvements in Lubricating Systems, of which the following is a specification.

This invention relates to an improved lubricating system designed for use particularly with crank shafts, for engines, in the use of which the lubricant is effectively supplied to the main and connecting rod bearing of said shaft, while being prevented to a considerable extent from passing into the cylinders.

In the drawing, the figure represents a crank shaft partly broken away, with a main bearing and connecting rod bearing in section, the lubricating system being shown as applied to said main bearing and connecting rod bearing.

In the drawing the crank shaft is shown as made up of a main bearing shaft portion 5 and crank pins 6 carried at the ends of crank arms 10. The main bearing 3 is provided with an oil receptacle 16 mounted on top of said bearing, and if desired held between said main bearing and the bottom of the cylinder block. The receptacle 16 is in communication with an oil supply pipe 14, which may lead from the usual pump, or with an oil reservoir 15 by which oil is supplied to the interior of the receptacle 16. A filter tube 17 is arranged interiorly of the receptacle 16 to filter or strain the oil through an outlet 20 in the main bearing 3 to the crank shaft 5.

Oil collecting members 7 are connected to the crank arms 10 on each side of the main portion 5 of said crank shaft, these members being constructed of sheet metal or the like and comprising spaced walls connected at their lower ends and with the outer wall terminating short of the inner wall. In applied position these collecting members are arranged about the main bearing 3, the outer wall of the member, that is the wall remote from the crank arm 10 being formed with an opening to fit over the end of the main bearing 3, while the inner wall of each of said members has an opening fitting more or less snugly in a groove or channel formed in the main bearing portion 5 of the crank shaft beyond the main bearing 3.

As thus arranged and with the crank arms 10 in the upright or vertical position as shown, the oil working around the main bearing will gravitate in the closed, at this time lower ends of the collecting members, and as the crank arms turn about the main portion 5 of the shaft, the oil collected is delivered into the upper portions of pockets formed between the outer walls of said members and the crank arms 10. The members 7 are secured to the crank arms 10 at the free ends of the latter, as by bolts 11.

The connecting rod bearing 4 is supplied with oil from the collection chambers formed by the collecting members at the outer ends of the crank arms, in the revolution of said arms, through channels 12 which extend through the crank arms to the collection chambers and through the crank pin 6, said channels 12 communicating with delivery channels 21 opening through the pin 6 to the bearing 4. The pin 6, beyond the bearing 4 is formed with annular channels 13, and the connecting rod bearing portion has annular collars 8 overlying the ends of the bearing 4 and terminating within the channels 13. The lower portion of the connecting rod bearing has formed, as a continuation of the collars 8 downwardly extending sections formed with channels 22 which lead to the vertical center line of the bearing 4 and have open discharged ends 23.

The oil delivered to the main bearings, it being understood that one or more of the main bearings may be constructed as shown, is finally delivered to the collection chambers formed by the members 7 at the outer ends of the crank arms, and delivered to the connecting rod bearings from which it finally escapes directly into the crank case through the outlets 23. It is understood that each connecting rod bearing is provided with the detailed construction illustrated in connection with one such bearing in the drawing.

Under the present system a sufficient quantity of oil is delivered to the main and connecting rod bearings, while such oil is not taken up by projections on the connecting rod bearing or by the arms of the crank shaft as is usual in splash system lubrication. Therefore by the present system the wastage of oil incident to such splash method of lubrication is entirely avoided, and hence the excess oil ordinarily finding its way into the cylinders is also avoided.

Having thus described the invention what is claimed as new is:—

1. An arrangement for lubricating the heads of connecting rods for thermal motors comprising two circular channels facing each other relative to the sleeves of the crank shaft, maintaining between them the bush of the connecting rod head and circular collectors concentric with the line of the joint existing between each channel and the corresponding cheek of the bush.

2. An arrangement for lubricating the heads of connecting rods, comprising two circular channels facing each other relative to the sleeves of the crank shaft, a bush for the connecting rod head disposed between the said channels, circular collectors which inclose the joint between each channel and the corresponding cheek of the bush, and means to secure the said collectors on the connecting rod head.

3. Lubricating arrangement for connecting rod heads, comprising two circular channels facing each other relative to the crank shaft sleeves, a bush in the connecting rod head disposed between the said channels and circular collectors which inclose the joint existing between each channel and the corresponding cheek of the bush, these collectors being formed in one with the connecting rod head.

4. Lubricating arrangement for connecting rod heads, comprising two circular channels facing each other relative to the crank shaft sleeves, a connecting rod head bush disposed between the said channels, circular collectors which inclose the joint between each channel and the corresponding cheek, a connecting rod head in one with the said collectors and two passages formed in the lower part of the connecting rod head in order to allow of communication between the collectors and the casing of the motor.

In testimony whereof I have hereunto signed my name.

JACQUES BIGNAN.